3,326,809
METHOD OF MAKING DIALLYL PHTHALATE KETONE PEROXIDE COMPOSITIONS
Orville L. Mageli, Grand Island, Solomon C. Westbrook, Jr., Buffalo, and James B. Harrison, Eggertsville, N.Y., assignors to Wallace & Tiernan Inc., Newark, N.J.
No Drawing. Filed May 15, 1962, Ser. No. 194,980
5 Claims. (Cl. 252—188.3)

The present invention relates to compositions of lower ketone peroxides and so-called allyl monomers, and to a method of making the same.

Heretofore, it has been proposed to prepare organic peroxides which are thermally unstable in inert organic media normally employed as plasticizers for certain specific resins and to employ such solutions in the preparation of the resinous end product, the composition providing initiators for the polymerization and plasticizers for the final resin.

The present invention related to compositions which contain polymerization initiators comprising organic peroxides and a polymerizable monomer specifically an allyl monomer and particularly the diallyl ester of phthalic acid.

The final composition contains a lower ketone peroxide as the polymerization initiator and diallyl phthalate as the monomer which may be copolymerized in the preparation of a commercially desirable final copolymer.

The lower ketones contemplated herein comprise symmetrical and asymmetrical ketones, the alkyl groups attached to the carbonyl group having up to and including 6 carbons, as for instance methyl hexyl ketone. Due to the commercial acceptability of methyl ethyl ketone peroxide, the invention will be illustrated as applied to that particular lower ketone peroxide.

The allyl monomer contemplated herein and with which the lower ketone peroxides are compatible and toward which they are relatively inert, are the allyl esters of dibasic aromatic acids and particularly the allyl esters of phthalic acid.

The compositions contemplated may contain from a few percent to about 80% by weight of ketone peroxide in the allyl monomer, based on the weight of the mixture. This system has been considered as a binary system when, in actual fact, it is probably a system of more components since the lower ketone peroxide is always associated with a small amount of water which is taken into solution in the monomer with the ketone peroxide so that the final composition may contain upwards of 8 to 10% of water based on the weight of the mixture.

Although the system, lower ketone-diallyl phthalate, is relatively thermally stable at room temperatures and at temperatures as high as 50° C., it may be advisable, under certain conditions of transportation and storage, when dealing in compositions having a high active oxygen content on the order of 11%, to permit an amount of water in the higher ranges of those mentioned, in order slightly to increase the thermal stability and further to increase the resistance of the material to decomposition by reason of possible entry of adventitious material. The amount of water capable of being incorporated in the system may be increased by adding hydrophylic materials relatively inert to the peroxide and which are not in themselves deleterious to the end use, as for instance aqueous methyl ethyl ketone, t-butyl alcohol, and the like.

The following examples are given merely as illustrative of the inventon and are not deemed to be limitative thereof.

*Example 1*

One mol of acetone (58 g.) were placed in the reaction flask equipped with thermometer and stirrer and containing 20 g. of a cation exchange resin; that is, an ion exchange resin in its acid form, specifically 20 g. of Amberlite 200. An excess of aqueous hydrogen peroxide, specifically 102 g. 50% hydrogen peroxide (1.5 mol) was added dropwise with stirring and the temperature maintained at 10° C.±2° C. and the mixture stirred for an additional 20 minutes. The cation exchange resin was removed from the reaction environment as by filtration, and 50 g. of diallyl phthalate added to the clear aqueous solution of acetone peroxide.

Should a cloudy and partially emulsified mixture result, a clear, single phase composition may be readily produced by adding salts which form hydrates with water, as for instance sodium sulfate, magnesium sulfate or any other desirable and suitable salt which forms a hydrate. The larger the quantity of salt added, the less will be the amount of water present in the resultant liquid mixture. After the separation, and if it be found desirable to produce a substantially dry product, the separated liquid may be dried in the usual way over magnesium sulfate.

In this procedure there was produced a product assaying 8.45% active oxygen determined in the usual way with iodide ion and subsequent titration of free iodine with standard thiosulfate solution.

The resultant acetone peroxide-diallyl phthalate solution was not shock sensitive, where acetone peroxide itself is extremely shock sensitive, all as determined by the accepted drop weight test. The resultant solution showed decomposition at 133° C. as contrasted with acetone peroxide which possesses great thermal instability.

The reaction of the same quantities of reactants proceeded smoothly and with production of the desired end product when diallyl phthalate monomer was present in the reaction environment initially. The final product isolated from the reaction possessed identical properties as indicated above, within permissible experimental error.

*Example 2*

Methyl ethyl ketone peroxide-diallyl phthalate was prepared by placing 72 g. methyl ethyl ketone, 50 g. diallyl phthalate and 50 g. of a sulfonic acid type cation exchange resin in its acid form, specifically Amberlite 200, into a reaction flask equipped with a thermometer and stirrer. 68 g. of aqueous hydrogen peroxide (50%) was added dropwise with stirring at a temperature of 10° C. ±2° C. and the mixture stirred for one hour. The resultant methyl ethyl ketone peroxide-diallyl phthalate solution was drained from the ion exchange resin and the resultant solution dried over magnesium sulfate.

The solution, when assayed as specified in Example 1 for active oxygen, gave a test of 8.6%. The final product was shock insensitive and decomposed at 130° C. when heated. Methyl ethyl ketone peroxide itself is shock sensitive and is relatively thermally unstable.

*Example 3*

Diisopropyl ketone peroxide was prepared by placing ½ mol of diisopropyl ketone, 57 g., and 50 g. diallyl phthalate in the kind of apparatus used in the previous examples, with 50 g. of the same type of ion exchange resin, and 0.75 mol of hydrogen peroxide, 51 g., was added dropwise and the mixture stirred for about ½ hour while maintaining the temperature at approximately 10° C. After this time, the liquid reaction mixture was removed from the resin, and to this solution was added a salt of the type mentioned in Example 1, and the two layers separated, the oil layer, the diisopropyl ketone peroxide-diallyl phthalate mixture, was dried over magnesium sulfate.

The dried product showed an active oxygen content of 8.65%. The product, by the drop-weight method, was determined to be shock insensitive. The product showed mild decomposition at 150° C.

Example 4

Methyl amyl ketone peroxide was prepared by placing 57 g. methyl amyl ketone (0.5 mol), 20 g. diallyl phthalate and 50 g. of a sulfonic acid type ion exchange resin in a flask equipped with dropping funnel, thermometer and stirrer, and 51.0 g. of 50% hydrogen peroxide (0.75 mol) added dropwise with stirring, and the stirring maintained for one hour at 10° C. The liquid phase was then separated from the resin and dried over magnesium sulfate.

The final product possessed an active oxygen content of 8.44%, and based on hydrogen peroxide was produced at a yield of 70%. The methyl amyl ketone solution so produced showed negative shock sensitivity by the standard drop-weight method at 1 to 7 inches. The methyl amyl ketone-diallylphthalate possessed a flash point of 180 to 185° C. and a slow burning rate.

In the same manner, one may prepare the peroxides of acetone, methyl ethyl ketone, dimethyl ketone, methyl propyl ketone, methyl butyl ketone, and methyl hexyl ketone.

The solutions of the above examples were all active in producing copolymerization with polyester compositions to produce set polyester resins.

The reaction between the lower ketone and aqueous hydrogen peroxide should be performed at temperatures generally less than 30° C. and preferably at 10° C. to 20° C., employing aqueous hydrogen peroxides of less than about 80% strength and preferably above 30% strength. The reaction between the hydrogen peroxide and the ketone proceeds spontaneously but is accelerated in the presence of hydrogen ion. The use of a cation exchange resin in its acid form insures the formation of the desired product under relatively nonhazardous conditions.

The amount of diallyl phthalate employed generally is such as to comprise from 10% to 80% of the final mixture. The ketone peroxides so formed are those having less than 7 carbon atoms in the saturated unsubstituted alkyl group attached to the carboxyl group of the ketone and are called herein lower ketone peroxides.

What is claimed is:
1. A method of preparing a solution of a lower ketone peroxide comprising reacting in the presence of a diallyl phthalate, an alkyl ketone having up to 6 carbons in the alkyl group, and aqueous hydrogen peroxide, said diallyl phthalate being present in an amount such that the final composition contains up to 80 percent ketone peroxide.
2. Process in accordance with claim 1 wherein the ketone is acetone.
3. Process in accordance with claim 1 wherein the ketone is methyl ethyl ketone.
4. Process in accordance with claim 1 wherein the ketone is diisopropyl ketone.
5. Process in accordance with claim 1 wherein the ketone is methyl amyl ketone.

References Cited
UNITED STATES PATENTS

| | | | |
|---|---|---|---|
| 2,374,789 | 5/1945 | Strain | 260—610 X |
| 2,424,851 | 7/1947 | Rudoff | 260—78.4 |
| 2,439,399 | 4/1948 | Shanley et al. | 260—610 |
| 2,821,520 | 1/1958 | Burnett | 260—78.4 |
| 3,003,000 | 10/1961 | Milas | 260—610 |
| 3,069,459 | 12/1962 | Tsou et al. | 260—475 |

OTHER REFERENCES

Amberlite Ion Exchange, page 10 (1 page), pub. by Rohm & Haas Co., The Resinous Products Division, Philadelphia (1953).

LEON ZITVER, *Primary Examiner.*

D. E. WYMAN, *Examiner.*

W. B. LONE, H. G. MOORE, *Assistant Examiners.*